INTERCONNECTOR FOR REGISTER-DIRECTOR SYSTEM

Filed Oct. 19, 1965 5 Sheets-Sheet 1

INTERCONNECTOR FOR REGISTER-DIRECTOR SYSTEM

| | | | | | |
|---|---|---|---|---|---|
| 1 | Rkr Rar | S1·2 | 6 | Rcr Rdr | S3·4 |
| 2 | Rar Rbr | S1·3 | 7 | Rkr Rdr | S1·5 |
| 3 | Rkr Rbr | S2·3 | 8 | Rer Rar Rdr | S2·5 |
| 4 | Rbr Rcr | S1·4 | 9 | Rer Rkr Rar | S3·5 |
| 5 | Rkr Rcr | S2·4 | 10 | Rer Rar Rbr | S4·5 |

United States Patent Office 3,505,480
Patented Apr. 7, 1970

3,505,480
INTERCONNECTOR FOR REGISTER-DIRECTOR SYSTEM

Egide Jacob Hendrik De Raedt, Hoboken-Antwerp, and Henri Albert Julia Verhille, Borgerhout-Antwerp, Belgium, assignors to International Standard Electric Corporation Filed Oct. 19, 1965, Ser. No. 497,755
Claims priority, application Netherlands, Dec. 21, 1964, 6414919
Int. Cl. H04m 7/12
U.S. Cl. 179—18 7 Claims

ABSTRACT OF THE DISCLOSURE

A solution is presented for seizing an incoming register of an indirect system upon receiving a call originating from a direct system. When such a call arrives at an incoming junctor a connection is made to an auxiliary register via a quick crossbar switch and, at the same time, an incoming main register is seized. After the first, or at the most the second, digit has been received by the auxiliary register, the latter is released and this digit is transferred to the seized incoming register. Due to the fact that the auxiliary registers only have to receive one or two digits, they are very simple and the time during which they are seized is very short, so that their number is limited. On the other hand, the incoming registers are arranged in an ideal group so that their number is small.

This invention relates to an automatic telecommunication switching system of the indirect or register type adapted for co-operation with a telecommunication switching system of the direct or step-by-step type. The system includes a source of selection information, said switching system of the register type including a group of first circuits, a group of second circuits comprising registering means, and means for interconnecting a first circuit and a second circuit, after said first circuit has been coupled to said source, within a time interval so that said selection information may then be received by said registering means comprised in said second circuit.

Such a switching system is already known from the Belgian Patent 639,639 to L. B. Dottax wherein said first and second circuits are constituted by incoming junctors and registers respectively and wherein said interconnecting means are constituted by rapidly operating cross-bar switches each able to interconnect a group of incoming junctors with a group of registers. Hereby these incoming junctors and registers are connected to the select and operate bars of the cross-bar switch respectively and by means of a preference circuit one of these registers is prepared to be connected to an incoming junctor when the latter junctor is seized, so that the above mentioned time interval is very small.

The presently known cross-bar switches of a not too high price have a relatively small capacity, so that used as a multi-switch they only permit the interconnection of a relatively small group of incoming junctors, e.g. 56, with a relatively small group of registers, e.g. 7, sufficient for handling the traffic of these incoming junctors. Hence, when the number of incoming junctors is large they have to be split into separate independent groups and a plurality of such cross-bar switches has to be provided, one for each group. But then, for a given traffic, the total number of registers required becomes considerably larger than if a single cross-bar switch could have been used enabling the registers to constitute an ideal group.

One might envisage the interconnection of a group of incoming junctors with a group of registers via two rapidly operating cross-bar switches in cascade. But then the time interval required for setting up a connection between an incoming junction and a register would be too large, a predetermined choice of a register being impossible so that in this case the selection information would consequently not be registered in due time.

It is therefore an object of the present invention to provide a telecommunication system of the above type, which does not present the above drawbacks.

The switching system according to the present invention is characterized in that said registering means are adapted to eventually register a part of said selecting information, that said switching system of the register type includes third circuits each comprising second registering means adapted to register the complete said selection information, a said third circuit being able to be coupled with said first circuit via second interconnecting means within a second time interval larger than the first time interval and that said switching system of the register type further includes third interconnecting means for transferring said part of said selection information from said first registering means towards said second registering means, the remaining part of said selection information being transferred from said source towards said second registering means via said first circuit and said second interconnecting means.

Another characteristic of the present switching system is that said first interconnecting means includes a first switching stage, whereas said second interconnecting means includes at least two second switching stages.

The advantage of the present switching system is that it permits a considerable gain in material with respect to the known switching system according to the above Belgian Patent 639,639 to L. B. Dottax, although it includes a number of auxiliary registers and associated first interconnecting means. This is due to the fact that the incoming junctors and main registers of the present switching system may be interconnected by said second interconnecting means so as to form an ideal group, such an ideal group requiring for a given traffic a minimum number of main registers, and due to the fact that the auxiliary registers are of a very simple structure since they only have to be able to register said first part of said information which is constituted by at most two digits.

The above mentioned and other subjects and features of the invention will become more apparent and the invention itself will be best understood by referring to the following description of an embodiment taken in conjunction with the accompanying drawings in which.

Figure 1:
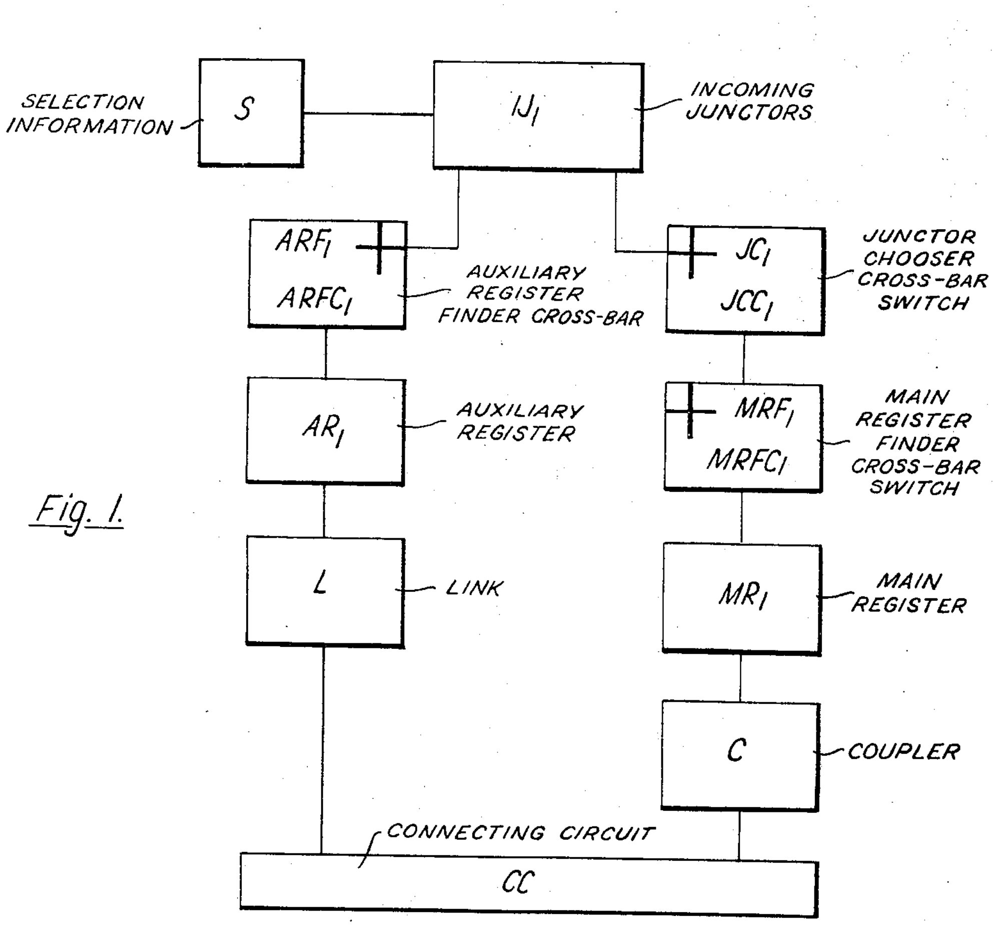
FIG. 1 is a schematic view of a part of a switching system according to the invention.

Principally referring to FIG. 1, the present automatic telecommunication switching system of the indirect or register type is adapted for co-operation with a telecommunication switching system of the direct or step-by-step type comprising a source of selection information S constituted by the dial and associated circuitry of a calling subscriber. The present switching system includes incoming junctors such as IJ1 able to be connected on the one hand, with the source of selection information S and on the other hand with a main register, such as MR1, and with an auxiliary register such as AR1. The interconnection of an incoming junctor IJ1 and a main register MR1 may be performed in a well known way via a junctor-to-main register switching network comprising two switching-stages, namely a junctor chooser cross-bar switch, such as JC1, included in a junctor chooser circuit, such as JCC1, and a main register finder cross-bar switch, such as MRF1, included in a main register finder circuit such as MRFC1. The interconnection of an incoming junctor IJ1 and an auxiliary register AR1 may be performed in a well known way via a junctor-to-auxiliary register connecting switch or an auxiliary register finder cross-bar switch such as ARF1 included in an auxiliary register finder circuit such as ARFC1. The cross-bar switch ARF1 is a rapidly operating one, whereas the cross-bar switches MRF1 and JC1 are slower operating ones. The auxiliary register AR1 may be connected to the main register MR1 through a digital transfer interconnecting circuit comprising link L, a connecting circuit CC and a coupler C in a way similar to the one described in the U.S. Patent No. 3,376,392 to H. Verhille wherein a register is connected to an outgoing junctor.

Figure 2:
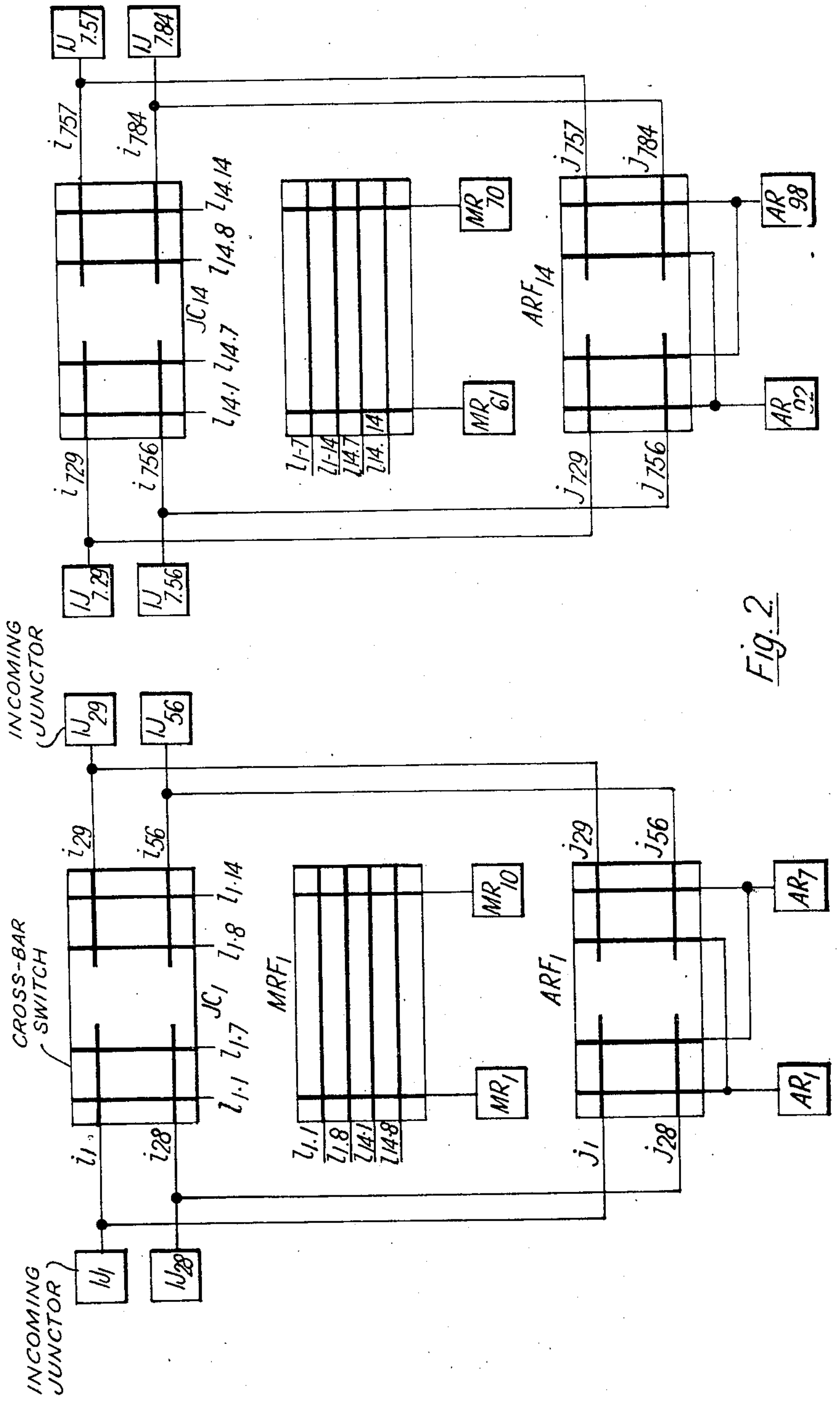
FIG. 2 shows an interconnection scheme of cross-bar switches included in a switching system according to the invention.

Principally referring to FIG. 2 the interconnection scheme of the incoming junctors with the auxiliary and main registers is shown in detail. It is supposed that there are 784 incoming junctors IJ1 to IJ784 in total. These 784 incoming junctors are distributed over 14 groups of 56 incoming junctors, the 56 incoming junctors of each such group being connected to the horizontal or select bars of fourteen cross-bar switches JC1–14 included in corresponding junctor chooser circuits and each consisting of two half switches, each with 28 horizontal or select bars and 7 vertical or operate bars. For instance the incoming junctors IJ1–28 and IJ29–56 are connected to the 28 horizontal bars of the first and second half switches of the cross-bar switch JC1 included in the junctor chooser circuit JCC1 via the leads *i*1–28 and *i*29–*i*56 respectively; the incoming junctors IJ729–756 and IJ757–784 are connected to the 28 horizontal bars of the first and second half switches of the cross-bar switch JC14 included in a corresponding junctor chooser circuit JCC14 (not shown) via the leads *i*724–756 and *i*757–*i*784 respectively.

The vertical or operate bars of the cross-bar switches JC1–14 are connected to the horizontal or select bars of seven cross-bar switches MRF1–7 included in corresponding main register finder circuits and each provided with 28 horizontal or select bars and 10 vertical or operate bars. For instance the first vertical bars of the two half switches of the cross-bar switches JC1–14 are connected to two successive horizontal bars of the cross-bar switch MRF1 via the leads *l*1–1, *l*1–8; . . .; *l*14–1, *l*14–8. The last vertical bars of the two half switches of the cross-bar switches JC1–4 are connected to two successive horizontal bars of the cross-bar switch MRF14 via the leads *l*1–7, *l*1–14; . . .; *l*14–7, *l*14–8. The vertical bars of the cross-bar switches MRF1–7 are connected to the main registers MR1–70. In this manner any of the incoming junctors IJ1–784 has access to any of the main registers MR1–70 and thus form an ideal group.

The 56 incoming junctors of each of the above groups are also connected to the horizontal or select bars of a rapidly operating cross-bar switch ARF1–14 included in a corresponding auxiliary register finder circuit and each consisting of two half switches each with 28 horizontal or select bars and 7 vertical or operate bars. For instance, the incoming junctors IJ1–28 and IJ29–56 are connected to the 28 horizontal bars of the first and second half switches of the cross-bar switch ARF1 via the leads *j*1–28 and *j*29–*j*56 respectively; the incoming junctors IJ729–756 and IJ757–784 are connected to the 28 horizontal bars of the first and second half switches of the cross-bar switch ARF14 via the leads *j*729–756 and *j*757–*j*784 respectively. The homologue vertical bars of each two half switches are joined so that each cross-bar switch ARF1–14 provides 7 outputs, which are connected to the auxiliary registers AR1–98.

Principally referring to the figures the operation of the switching system will now be described in detail.

Figure 3:
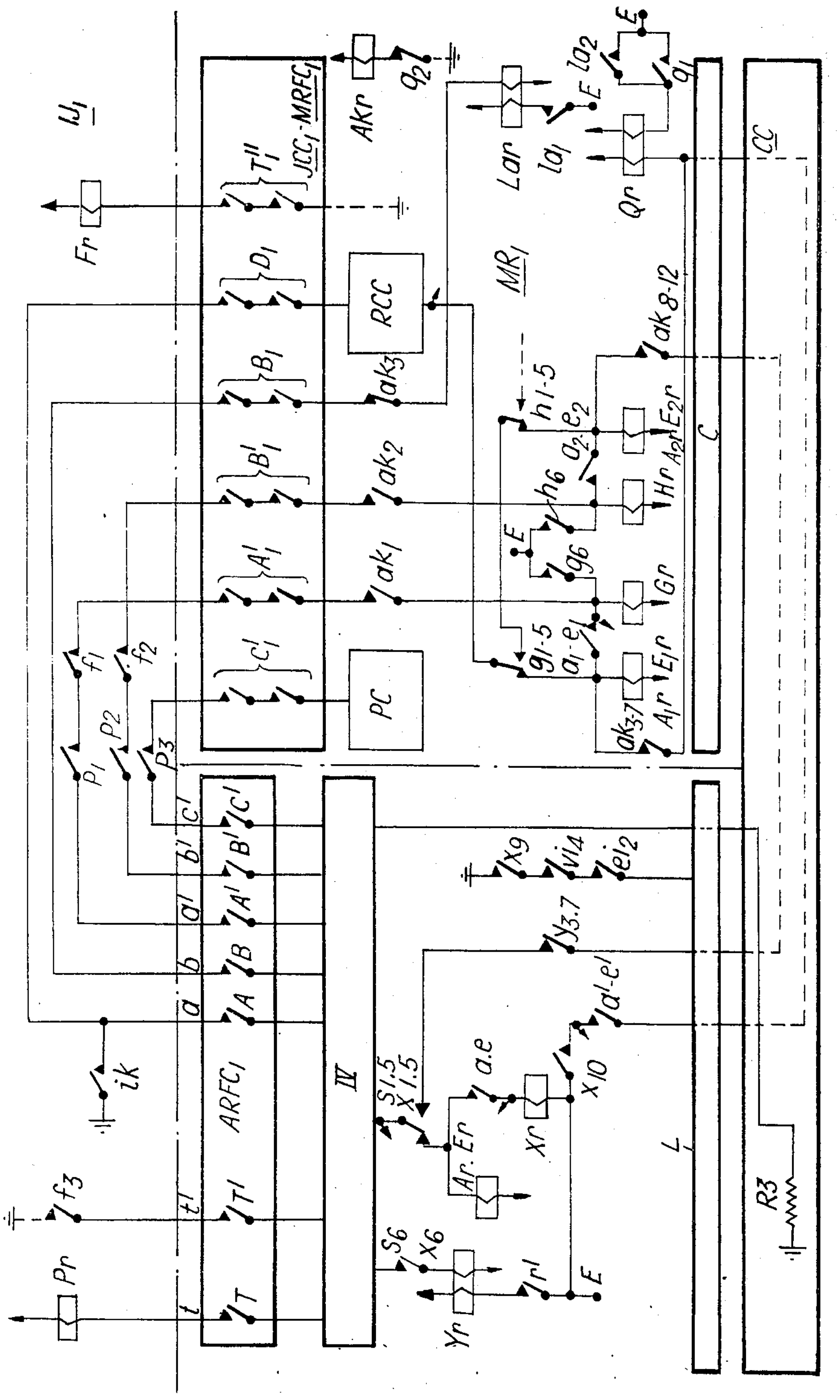
FIG. 3 shows the circuitry of the switching system of FIG. 1.

After the source of selection information S has been connected to the incoming junctor IJ1 the latter is connected to the auxiliary register AR1 in the manner disclosed in the above mentioned Belgian Patent 639,639 to L. B. Dottax. Therein is described that relay K*yr* in the auxiliary register AR1 is temporarily energized and that afterwards the connection with the incoming junctor IJ1 is established. This connection is realised via eight contacts of the cross-bar switch ARF1, only seven of these contacts being shown, namely T, T', A, B, A', B', C' (FIG. 3). The description of the complete operation will not be repeated here, except the operation of the other relays included in this auxiliary register AR1, since this operation is somewhat different from what is described in this Belgian Patent 639,639 to L. B. Dottax.

It should be noted that after the source of selection information S has been connected to the incoming junctor IJ1, a connection is also being established between this junctor and one of the main registers e.g. MR1. This connection is however realized in a much slower way than between this incoming junctor IJ1 and the auxiliary register AR1 since two slower operating cross-bar switches must be operated and since none of the main registers can be prepared for operation. It is supposed that this connection will be established via cross-bar switches JC1 and MRF1 included in the junctor chooser circuit JCC1 and in the main register finder circuit MRFC1 respectively.

By the above mentioned temporary operation of relay K*yr* the impulse receiving relay R*fr* (FIG. 4) is operated as follows: battery, right hand winding of relay R*fr*, closed make contact *ky*, closed break contact *vi*1, ground.

Due to this relay K*gr* (FIG. 4) is energized in the following manner: ground, winding of relay K*gr*, closed break contact *vi*2, change-over contact *rfl* in its work position, battery. By the closure of a not shown contact of relay K*gr* the operating electro-magnet of the vertical select bar to which the auxiliary register AR1 is connected is maintained energized. The right hand winding of relay R*fr* is maintained energized via its closed make contact *rf*3 and afterwards through the closed make contact *kg*9 whereas its left hand winding is connected to the impulsing contact *ik* in the incoming junctor IJ1 in the following manner: battery, left hand winding of relay R*fr*, closed break contact *vi*3, closed cross-bar switch make contact *kg*2, closed cross-bar switch make contact A, impulsing make contact *ik*.

The relay K*lr* (FIG. 4) is energized as follows: battery, left hand winding of relay K*lr*, closed make contact *kg*3, ground.

By closure of the make contact *kl* a ground is connected to various terminals E, which are joined together, via a high resistance R2; by the closure of make contact *kg*8 a general ground is directly connected to all these joined terminals E.

From the above it follows that after the incoming junctor IJ1 has been connected to the auxiliary register AR1, the relays R*fr*, K*lr* and K*gr* of the latter register AR1 are operated, this register being thus able to handle a call.

By the interconnection of IJ1 and AR1 the relay P*r* in the incoming junctor IJ1 is energized as follows: battery, winding of relay P*r*, closed cross-bar switch make contact T, ground in auxiliary register AR1. Via the closed make contacts *p*1–2–3 the leads *a'*, *b'*, *c'* are prepared for being connected to a main register via a junction chooser cross-bar switch and a main register finder cross-bar switch. By the operation of relay P*r* it is indicated in the incoming junctor IJ1 that the auxiliary register AR1 and this incoming junctor IJ1 have been interconnected.

After the incoming junctor IJ1 and the auxiliary register AR1 have been interconnected and before this incoming junctor is connected to a main register, such as MR1, a maximum number of two dialed digits may be received in the incoming juctor LJ1 from the source of selection information S. The number of digits received in the incoming junctor IJ1 depends on the rapidity with which the subscriber starts dialing after he has been brought in communication with the auxiliary register AR1. When such dialed digits are received in the incoming junctor IJ1 by not shown but classical receiving means, they are transmitted to the auxiliary register AR1 by means of the impulsing contact *ik* and are registered in this auxiliary register AR1 in a manner which will be described later.

It is first supposed that at the moment a main register such as MR1 is connected to the incoming junctor IJ1 no dialing pulses have been received in the latter junctor. At the moment the main register MR1 is connected to the incoming junctor IJ1 a general ground is applied in this register to all the terminals E in a manner similar to that described above for the auxiliary register AR1. A ground is also connected to the winding of the relay F*r* in the incoming junctor IJ1 through not shown contacts, so that this relay is operated in the following manner; ground, not shown closed contacts, closed cross-bar switch make contacts T'*l*, winding of relay F*r*, battery.

By operation of relay F*r* the incoming junctor IJ1 is informed that a main register has been connected to it.

In the main register MR1 a ground is also connected to the winding of the relay A*kr* via not shown contacts and the closed break contact *q*2 of the relay Q*r*. By the operation of relay A*kr* it is indicated in the main register MR1 that the latter has been connected to an incoming junctor and is ready to receive signalling information (closure of contacts *ak*1, *ak*2, *q*3).

From the above it follows that in the auxiliary register AR1 the relays K*gr*, K*lr* and R*fr* are energized, while in the incoming junctor IJ1 the relays P*r* and F*r* and in the main register MR1 the relay A*kr* are operated. Due to this the following circuits are established.

The relay T*cr* in the auxiliary register AR1 is energized as follows: battery, winding of relay T*cr*, closed make contact *kg*1, closed cross-bar switch make contact T', closed make contact *f*3, not shown closed contacts, ground.

By the operation of relay T*cr* it is indicated in the auxiliary register AR1 that the latter has been connected to a main register. The relay T*cr* is locked in the following circuit: battery, winding of relay T*cr*, closed make contact *tc*3, ground on terminal E.

The relays E*ir* in the auxiliary register AR1 and L*ar* in the main register MR1 are then energized as follows: ground, winding of relay E*ir*, closed make contact *tc*1, closed break contact *il*2, change-over contact *x*7 in its rest position, closed cross-bar switch make contact B, lead *b*, closed cross-bar switch make contact B1, closed break contact *ak*3, right hand winding of relay L*ar*, battery.

The relays E*ir* and L*ar* are signalling relays, since by the operation of the first it is indicated that a connection has been established between the auxiliary register AR1 and the main register MR1, whereas by the operation of the second relay L*ar* it is indicated in the main register MR1 that no dialled digits have been received and stored in the auxiliary register AR1, this signalling operation being performed via the lead *b*. As will be described later, for signalling to the main register MR1 that one and two dialled digits have been received and registered in the auxiliary register AR1 the leads *a'* and *b'* are used respectively.

In the auxiliary register the relay V*ir* is then energized as follows: battery, winding of relay V*ir*, closed make contact *ei*4, ground on terminal E.

The relay V*ir* is locked via its closed make contact *vi*5 and memorizes the fact that the relay E*ir* has been operated. By the opening of its break contact *vi*3 the left hand winding of relay R*fr* is disconnected from the impulsing make contact *ik*, so that no dial impulses can be received in the auxiliary register AR1.

In the main register MR1 the relay L*ar* is locked via its left hand winding and the closed make contact *la*1, whereas the relay Q*r* is energized through its right hand winding and the closed make contact *la*2 and is afterwards locked through its closed make contact *q*1. By the opening of break *q*2 the relay A*kr* is released and by the opening of break contact *q*3 the series circuit of the relays L*ar* and E*ir* is interrupted so that the signalling operation is finished.

In the auxiliary register the relay R*fr* is released due to the opening of the closed make contact *ei*1, whereas the relay K*gr* is de-energized due to the opening of closed make contact *ei*3. By the opening of make contact *kg*8 the general ground is disconnected from the terminal E and the relay V*ir* is released due to its winding being now connected to ground via the high resistance R2. By the opening of the above mentioned not shown make contact of relay K*gr* included in the locking circuit of the operating electromagnet of the vertical or select bar connected to the auxiliary register AR1, this vertical bar is released and the auxiliary register is consequently disconnected from the incoming junctor IJ1.

The main register MR1 is now in a condition to receive dialled digits transmitted by the incoming junctor IJ1 via its impulsing contact *ik*. In a classical way dial pulses of each dialled digit are registered in a registering and checking circuit RCC, where they are for instance translated in a 2-out-of-5 code and afterwards successively distributed in the storage circuits including the storing relays A1*r*–E1*r*, A2*r*, E2*r*, etc. For instance, when the first dialled digit has been registered in the counting and registering circuit RCC a ground is applied therein in such a manner that two of the five relays A1*r*–E1*r* are energized via the change-over contacts *g*1–5, of the progression relay G*r*, in their rest position. By the closure of a contact *al*–*el* this progression relay G*r* is then energized due to which change-over contacts *g*1–5 are brought in the work position and the relay G*r* is locked via its closed make contact *g*6 and a ground on terminal E. The second dialled digit registered in the counting and registering circuit RCC is then stored in the relays A2*r*–E2*r* via the change-over contacts *g*1–5 in their work position and *h*1–5 in their rest position, etc.

It is now secondly supposed that before a main register such as MR1 is connected to the incoming junctor IJ1 one dialled digit is received in this junctor.

In the incoming junctor JL1 the received dialled pulses of the dialled digit are received by the above mentioned receiving means included therein and transmitted to the auxiliary register AR1 via the impulsing make contact *ik*. Each dialled digit is constituted by minimum one and maximum ten dial pulses, so that the make contact *ik* will be closed and opened a corresponding number of times. When the impulsing make contact *ik* is closed for the first time, a ground is applied to the left hand winding of the relay R*fr* in which is developed a magnetizing field opposite to that developed in the right hand winding and of such a magnitude that this relay R*fr* is de-energized.

By the change of position of the change-over contact *rf*1 the slowly releasing relay R*gr* is operated in series with the relay K*gr* in the following manner: ground, winding of relay K*gr*, closed break contact *vi*2, closed make contact *kg*5, winding of relay R*gr*, battery.

Due to the change of position of the contacts *rf*2 and *rf*5, the relay R*jr* is energized as follows: battery, right hand winding of relay R*jr*, closed make contact *kg*6, change-over contact *rk*2 in its rest position, closed break contact *rf*5, change-over contact *rf*2 in its rest position, terminal E at ground potential.

The right hand winding of relay R*jr* is maintained energized in the following circuit: battery, right hand winding of relay R*jr*, closed make contact *rj*3, resistance R1, change-over contact *rf*2 in its rest position, ground on terminal E.

As will become clear later and as shown on FIG. 5 the relay R*jr* is alternately operated and releaesd for the odd and even numbered dialled pulses respectively.

The slowly releasing relay R*hr* is energized in the following manner due to the closure of make contact *rgl*: battery, winding of relay R*hr*, closed make contact *rgl*, ground on terminal E.

As will also become clear later the relay R*hr* will only be released after the receipt of all the dial pulses of a dialled digit. The right hand winding of this relay R*jr* is also maintained energized as follows: battery, right hand winding of relay R*jr*, closed make contact *rj*3, changeover contact *rjl* in its rest position, closed make contact *rh*4, ground on terminal E.

The relay I*lr* is operated as follows: battery, winding of relay I*lr*, closed break contact *rf*4, closed make contact *kg*7, ground on terminal E.

By the closure of its make contact *il*1 relay I*lr* is locked in the following manner: battery, winding of relay I*lr*, closed make contact *il*1, closed break contact *x*8, ground on terminal E.

By the opening of break contact *il*2 the winding of relay E*ir* is disconnected from the lead *b* so that no signalling operation can be performed.

By the operation of relay I*lr* it is indicated that the first dial pulse is being registered in the auxiliary register AR1.

The relay R*ar* is now energized as follows: battery, right hand winding of relay R*ar*, closed make contact *rj*5, change-over contacts *rb*2, *rc*2, *rd*2, *re*2 in their rest position closed make contact *rh*4, ground on terminal E.

Figure 4:
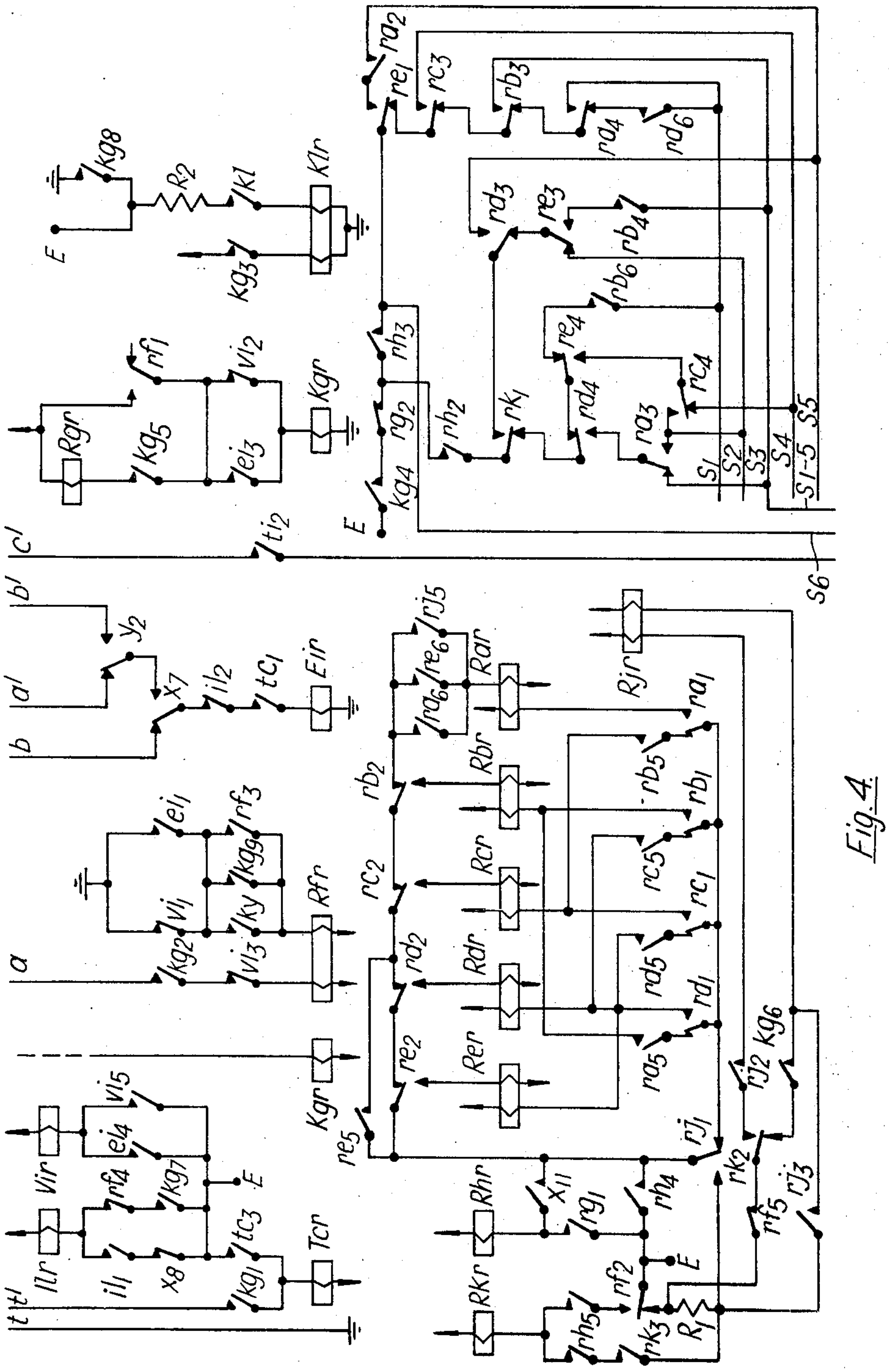
FIG. 4 shows in more detail the part of FIG. 3 indicated by IV.

From the above it follows that when the first dial pulse is received in the auxiliary register AR1, this is registered in the relay R*ar* of the registering part R*ar*–R*er* of the registering and checking circuit represented in the lower half part of FIG. 4.

Figures 5, 6:
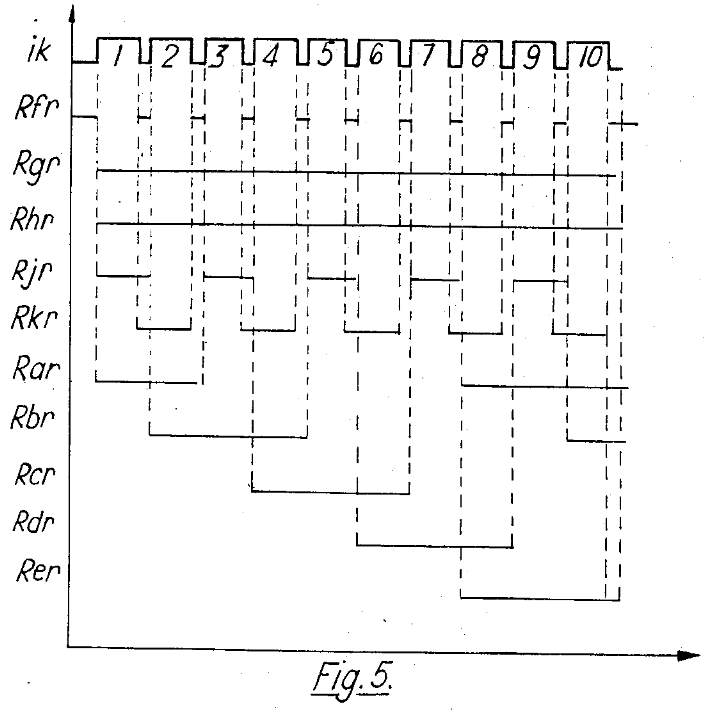
FIG. 5 is a time diagram of relays included in the circuitry of FIG. 4.
FIG. 6 is a table showing the succession of operation of relays included in the circuit of FIG. 4.

As schematically represented in FIG. 5 also the relays R*gr*, R*hr* and R*jr* are operated in this auxiliary register AR1.

When the first dial pulse is finished, i.e. when impulsing make contact *ik* is opened, the left hand winding of the relay R*fr* is de-energized so that this relay is operated again via its right hand winding which is still energized. By the change of position of the change-over contact *rfl* the winding of the slowly releasing relay R*gr* is short-circuited, so that this relay R*gr* starts releasing. By the change of position of change-over contact *rf*2 the relay R*kr* is energized as follows: battery, winding of relay R*kr*, closed make contact *rj*4, change-over contact *rf*2 in its work position, ground on terminal E.

The relay R*kr* is locked in the following circuit: battery, winding of relay R*kr*, closed make contacts *rh*5 and *rk*3, change-over contact *rj*1 in its work position, closed make contact *rh*4, ground on terminal E.

When no second dial pulse is received in the incoming register IJ1 the impulsing contact *ik* is not closed a second time so that after a certain time interval the relay R*gr* is completely released. By the opening of closed make contact *rgl* the slowly releasingly relay R*hr* also starts releasing. During the time interval the relay R*gr* is released but the relay R*hr* is still operated, the output leads *s*1 and *s*2 of the checking part of the above registering and checking circuit are activated as follows: ground on terminal E, closed make contact *kg*4, closed break contact *rg*2, closed make contact *rh*3, change-over contacts *re*1, *rc*3, *rb*3 in their rest position, change-over contact *ra*4 in its work position and output lead *s*1; and: ground on terminal E; closed make contact *kg*4, closed break contact *rg*2, closed make contact *rh*2 change-over contact *rk*1 in its work position, change-over contacts *rd*3 and *re*3 in their rest position and output lead *s*2.

In the case a second dial pulse is received, the impulsing contact *ik* is closed a second time so that the left hand winding of relay R*fr* is again energized and this relay R*fr* is consequenctly released again. By the change of position of contact *rf*1 the relay R*gr* remains energized in series with the relay K*gr* and by the closure of break contact *rf*5 the relay R*jr* is released due to its right hand winding being already energized and due to its left hand winding, which is oppositely wound with respect to the right hand winding, being now energized in the following manner: battery, left hand winding of relay R*jr*, closed make contact *rj*2, change-over contact *rk*2 in its work position, closed break contact *rf*5, change-over contact *rf*2 in its rest position, ground on terminal E.

The relay R*ar* is then locked in the following manner by the change of position of contact *rj*1: left hand winding of relay R*ar*, change over contact *ral* in its work position, change-over contact *rj*1 in its rest position, closed make contact *rh*4, ground on terminal E.

By opening of the closed make contacts *rj*2 and *rj*3 the energizing circuits for the left and right hand windings of relay R*jr* are opened. Although the change of position of contact *rj*1 the relay R*kr* is maintained energized via the closed make contacts *rh*5 and *rk*3, the resistance R1 and the change-over contact *rf* 2 in its rest position.

The relay R*br* is energized as follows by the change of position of contact *rjl*: battery, left hand winding of relay R*br*, closed make contact *ra*5, closed break contact *rdl*, change-over contact *rjl* in its rest position, closed make contact *rh*4, ground on terminal E.

Relay R*br* is locked in the following circuit: battery, right hand winding of relay R*br*, change-over contact *rb*2 in its work position, change-over contacts *rc*2, *rd*2, *re*2 in their rest position, make contact *rh*4 in its work position, ground on terminal E.

From the above it follows that when the second dial pulse is received in the auxiliary register AR1, this is registered in the registering circuit R*ar*–R*er* wherein the relays R*ar* and R*br* are energized. As is schematically represented in FIG. 5 at that time also the relays R*gr*, R*hr*, R*kr* are operated whereas the relay R*jr* is released in this auxiliary register.

When this second dial pulse is finished i.e. when the impulsing contact *ik* is opened the left hand winding of relay R*fr* is de-energized so that this relay is operated again through its right hand winding which is still energized. By the change of position of the change-over contact *rfl* the winding of the slowly releasing relay R*gr* is short-circulated, so that this relay R*gr* starts releasing. Relay R*kr* is released due to its holding circuit including the contacts *rh*5, *rk*3 and *rf*2 being opened in the contact *rf*2 which is brought in its work position.

When no third dial pulse is received in the incoming register IJ1 the impulsing contact *ik* is not closed a third time so that after a certain time interval the relay R*gr* is completely released. By the opening of closed make contact *rg*1 the slowly releasing relay R*hr* also starts releasing. During the time interval the relay R*gr* is released but the relay R*hr* is still operated, the output leads *sl* and *s*3 in the above checking circuit are activated as follows: ground on terminal E, closed make contact *kg*4, closed break contact *rg*2, closed make contact *rh*2, change-over contacts *rk*1, *rd*4, *re*4 in their rest position, closed make contact *rb*6 and output lead *s*1; and: ground on terminal E, closed make contact *kg*4, closed break contact *rg*2, closed make contact *rh*3, change-over contacts *re*1 and *rc*3 in their rest position, change-over contact *rb*3 in its work position, and output lead *s*3.

In the above it has been described how a dialled digit constituted by one and two dial pulses is registered in the auxiliary register AR1, due to which the output leads *s*1, *s*2 and *s*1, *s*3 are activated after the receipt of the last dial pulse of the digit. The auxiliary register is also adapted to register in an analogous manner three, four, . . . , ten dialling pulses of a dialled digit. In these cases two of the five output leads *s*1–5 of the registering and checking circuit will again be activated at the end of the receipt of the last pulse of the digit, the output leads activated being indicated in the table of FIG. 6. Hereby it should be noted that the signals appearing at the output leads *s*1 to *s*5 have the weights 0, 1, 2, 4 and 7 respectively, digit 10 being however an exception since output leads *s*4 and *s*7 are activated in this case.

In FIGS. 5 and 6 the states of a plurality of relays included in the auxiliary register AR1 are shown during the receipt of maximum ten dial pulses. Therefore it is thought not to be necessary to describe the complete operation of the receipt of three, four, . . . , ten dial pulses since this registering and checking operation moreover does not form part of the invention.

When all the dial pulses of a first digit dialled, e.g. 7, have been registered by the relays R*ar*–R*er* and two corresponding output leads, *s*1 and *s*5, of the group *s*1–*s*5 have been activated after the receipt of the last dial pulse, i.e. during the time interval that the relays R*gr* and R*hr* are released and temporarily activated respectively, the following happens.

Two relays A*r* and E*r* (not shown) of the storage circuit including the relays A*r*/E*r* (FIG. 3) are then activated via the ground on the two activated output leads *s*1 and *s*5 and the change-over contacts *x*1 and *x*5 in their rest position.

At the moment the relay R*hr* is completely released the relays R*ar*, R*er* energized in the group R*ar*–R*er* are released due to the opening of the closed make contact *rh*4 and also the above two output leads *s*1 and *s*5 are deactivated due to the opening of the make contact *rh*2 and *rh*3 in the checking circuit. The two operated relays A*r* and E*r* are however maintained energized as follows: battery, parallel connection of two series circuits constituted by the winding of relay A*r* in series with its closed make contact *a* and the winding of relay E*r* in series with its closed make contact *e*, common relay X*r*, ground on terminal E.

By the operation of relay X*r* it is indicated that a first digit has been stored in the storage circuit A*r*–E*r*.

By the change of position of the change-over contacts *x*1–5 the output leads *s*1–5 are disconnected from the windings of the relays A*r*–E*r* and connected to the make contacts *y*3–7 of a relay Y*r* respectively. By the closure of the make contact *x*6 the left hand winding of the relay Y*r* is connected to the above checking circuit via the output lead *s*6. By the opening of the break contact *x*8 the relay I*lr* is released and by the change of position of the change-over contact *x*7 and the closure of the break contact *il*2 the winding of the relay E*ir* is prepared for being connected to a main register via the lead *a'* in order to signal that a digit is registered in the auxiliary register AR1.

It is now supposed that during the transmission of the dial pulses of the first digit, 7, from the incoming junctor IJ1 to the auxiliary register AR1 a main register such as MR1 has been connected to this incoming junctor IJ1. In the same manner as described above the relay A*kr* is energized in the main register MR1, the relay F*r* is operated in the incoming junctor and the relay T*er* is energized in the auxiliary register A*r*1, wherein also the relays K*gr*, K*lr*, R*gr*, R*fr*, R*hr*, A*r*, E*r* and X*r* are operated.

The relays E*ir* in the auxiliary register AR1 and G*r* in the main register MR1 are energized as follows: ground, winding of relay E*ir*, closed make contact *tc*1, closed break contact *il*1, change-over contact *x*7 in its work position, change-over contact *y*2 in its rest position, closed cross-bar switch make contact A', lead *a'*, closed make contacts *p*1 and *f*1, closed cross-bar switch make contacts A'1, closed make contact *ak*1, winding of relay G*r*, battery.

The main register MR1 is thus informed about the fact that the first dialled digit has been registered in the auxiliary register AR1, and that the following ones will be registered in the main register.

In the auxiliary register the relay V*ir* is then energized and locked, in a manner already described, above via the contacts *ei*4 and *vi*5.

The left hand winding of relay R*fr* is disconnected from the impulsing contact *ik* by the opening of the break contact *vi*3. The right hand winding of relay R*fr* remains energized due to the closure of make contact *ei*1 and although break contact *vi*1 is opened. Also the relay K*gr* remains energized due to the closure of make contact *ei*3 and although break contact *vi*2 is opened.

By the closure of the make contact *x*9, *vi*4 and *ei*2 the search for a free link, such as L, and a free connecting circuit, such as CC, is started and at the end of this operation the free link L and the connecting circuit CC are connected to the auxiliary register AR1. The identity of this connecting circuit CC is then transmitted towards the main register MR1 in the following manner: ground and resistance R3 in the connecting circuit CC, link L, lead *c'* and closed contact *tc*2 in the auxiliary register AR1, closed cross-bar switch make contact C', closed make contact *p*3 in the incoming junctor IJ1, closed cross-bar switch make contact C'1, potential comparator circuit PC in the main register MR1. When the main register MR1 has thus been informed about the identity of the connecting circuit to which the auxiliary register AR1 has been connected, it searches for a coupler circuit C which connects itself to the same connecting circuit CC. In this manner the auxiliary and main register AR1 and MR1 are interconnected via the link L, the connecting circuit CC and the coupler C.

The operation consisting in interconnecting the main and auxiliary register MR1 and AR1 via a link, a connecting circuit and a coupler is analogous to that described in the Belgian Patent 647,330 to H. Verhille and is therefore neither described nor shown.

As mentioned above the relays A*kr* and G*r* are energized in the main register MR1. The progression relay G*r* is locked in the following manner: battery, winding of relay G*r*, closed make contact *g*6, ground on terminal E.

By the change of position of the change-over contacts *g*1–5 the five output leads of the registering and checking circuit RCC, which has been connected to the impulsing contact *ik* through the closed cross-bar switch make contacts D1, are connected to the change-over contacts *h*1–5 in their rest position. Thus the dial pulses of the second digit dialed will be registered in the registering and circuit RCC, which is of the same type as the one shown in detail on FIG. 4, and stored in the storage circuit including the storing relays A2*r*–E2*r*.

By the opening of make contacts *akl* and *ak*2 the progression relays G*r* and H*r* are disconnected from the closed cross-bar switch make contacts A'1 and B'1 so that signalling is prevented and by the closure of the make contacts *ak*3–7 the following circuit is established in order to transfer the contents of storage circuit *A*r–E*r* to the storage circuit A*lr*–E*lr*; batteries and windings of the relays A*lr*–E*lr* in the main register MR1, closed make contacts *ak*3–7, a path through the coupler C, the connecting circuit CC and the link C, make contacts *a'*–*e'* of relays A*r*–E*r* in the auxiliary register AR1, closed make contacts *x*10, ground on terminal E. As supposed above the relays *A*r and E*r* are operated so that the make contacts *a'* and *e'* are closed and that consequently the relays A*lr* and E*lr* in the main register MR1 are operated.

These relays A*lr* and E*lr* are locked by the closure of the make contacts *al* and *el* and through the closed make contact *g*6 of the progression relay.

The relay Q*r* in the main register is energized in parallel with the relays A1*r* and E1*r* through its left hand winding and is locked through its right hand winding and its closed make contact *q*1. By the operation of relay Q*r* it is indicated that the transfer of information is finished.

By the opening of break contact *q*2 the relay A*kr* is released and due to the opening of the closed make contacts *ak*3–7 the relays A*lr*–E*lr* are disconnected from the auxiliary register AR1. By the opening of the closed make contact *akl* the relays G*r* and E*ir* are disconnected from each other due to which the latter relay E*ir* in the auxiliary register AR1 is released and signalling is prevented.

The main register MR1 then disconnects itself from the coupler and connecting circuits C and CC and is now able to register the second and following dialled digits in its registering and checking circuit RCC and in the storage circuits such as the one including the relays A2*r*–E2*r*.

In the auxiliary register AR1 the relay R*fr* is released due to the opening of the closed make contact *ei*1, and by the opening of the closed make contact *ei*2 the link and connecting circuits L and CC are disconnected from the auxiliary register AR1.

In this auxiliary register the relay K*gr* is released due to the opening of closed make contact *ei*3. By the opening of the make contact *kg*8 the general ground is disconnected from the terminal E and the relay V*ir* is released due to its winding being now connected to ground via the high resistance R2. For the same reason the relays A*r*, E*r* and X*r* are de-energized.

By the opening of the above mentioned not shown make contact of relay K*gr* included in the locking circuit of the operating electro-magnet of the vertical or select bar connected to the auxiliary register AR1, this vertical bar is released and the auxiliary register AR1 is consequently disconnected from the incoming junctor IJ1.

It is finally supposed that before a main register such as MR1 is connected to the incoming junctor two dialled digits are received in this junctor.

In the same manner as described above the first dialled digit is stored in two of the relays of the storage circuit including the relays A*r*–E*r* and the progression relay X*r* is energized. By the change of position of the change-over contacts *x*1–5 the output leads *s*1–5 are disconnected from the windings of the relays A*r*–E*r* and connected to the make contacts *y*2–7 respectively. By the closure of the make contact *x*6 the right hand winding of the relay Y*r* is connected to the checking circuit via the output lead *s*6 and by the opening of the break contact *x*8 the relay I*lr* is released. In a manner such as described for the first dialled digit the second dialled digit is registered in two of the relays R*ar*–R*er*, e.g. R*ar* and R*br*. When the last dialling pulse of this digit has been received the relay R*gr* is released but this time the slow releasing relay R*hr* is not released by the opening of make contact *rgl* since the latter contact is shunted by the closed make contact *xl*1 of the progression relay X*r*.

The relay Y*r* is then energized as follows: right hand winding of relay Y*r*, closed make contact *z*6, output lead *s*6, closed make contact *rh*3, closed break contact *rg*2, closed make contact *kg*4.

This relay Y*r* is locked via its right hand winding and the closed make contact *yl*. Due to the contacts *kg*4, *rg*2, *rh*2, *rh*3 being closed and due to the relays R*ar* and R*br* being energized the output leads *sl* and *s*2 are activated.

In a manner described above, when the incoming junctor IJ*l* is now connected to a main register, such as MR1, the relay A*kr* is energized in this register, the relay F*r* is operated in the incoming junctor IJ*l* and the relay T*cr* is energized in the auxiliary register AR*l* wherein also the relays K*gr*, K*lr*, R*gr*, R*kr*, R*fr*, A*r*, E*r*, R*ar*, R*br*, X*r* and Y*r* are operated at that time.

The relays E*ir* in the auxiliary register A*rl* and H*r* in the main register MR*l* are energized as follows in order to signal that two dialled digits are registered in this auxiliary register: ground, winding of relay E*ir*, closed make contact *tcl*, closed break contact *il*2, change-over contacts in *x*7 and *y*2, in their work position, closed cross-bar switch make contact C′, lead *b*′, closed make contacts *p*2 and *f*2, closed cross-bar switch make contacts B′1, closed make contact *ak*2, winding of relay H*r*, battery.

The main register MR1 is thus informed about the fact that the first and second dialled digits have been registered in the auxiliary register AR1 and that the following ones will be registered in the main register MR1.

In the same manner as described above the relay V*ir* is then energized in the auxiliary register AR1, and by the closure of the make contacts *x*9, *vi*4 and *ci*2 an operation is started the aim of which is to interconnect the auxiliary and main registers AR1 and MR1 via a link, a connecting circuit and a coupler.

As mentioned above the relays A*kr* and H*r* are energized in the main register MR1. The progression relay H*r* is locked in the following manner: battery, widing of relay H*r*, closed make contact *h*6, ground on terminal E.

By the change of position of the change-over contacts *h*1–5 the five output leads of the registering and checking circuit RCC, which has been connected to the impulsing contact *ik* through the closed cross-bar switch make contacts D1, are coupled to other not shown storing relays of a storage circuit. Thus the dial pulses of the third digit dialled will be registered in the registering and checking circuit RCC and stored in the above not shown storing relays.

By the opening of the make contacts *ak*1 and *ak*2 the relays G*r* and H*r* are disconnected from the closed cross-bar switch make contacts A′1 and B′1 and by the closure of the make contacts *ak*3–7 and *ak*8–13 the following circuits are established in order to transfer the contents of the storage circuits A*r*–E*r* and R*ar*–R*er* to the storage circuits A*ir*–E*ir* and A2*r*–E2*r* respectively: batteries and windings of the relay A*lr*–E*ir* in the main register MR1, closed make contacts *ak*3–7, a path through the coupler C, the connecting circuit CC and the link L, make contacts *a*′–*e*′ of relays A*r*–E*r* in the auxiliary register AR1, closed make contact *x*10, ground on terminal E; and batteries and windings of the relays A2*r*–E2*r* in the main register MR1, closed make contacts *ak*8–12, a path through the coupler C, the connecting circuit CC and the link L, closed make contacts *y*3–7, change-over contacts *x*1–5 in their work position, output leads *s*1–5, ground on those of the output leads *s*1–5 which are activated.

As supposed above the relays A*r*, E*r* and R*ar*, R*br* are operated in the auxiliary register AR1 so that the relays A*lr*, E1*r*, A2*r* and B2*r* in the main register MR1 will be energized and locked via the contacts *g*6 and *h*6 respectively.

The relay Q*r* in the main register is energized in parallel with the relays A*lr* and E*lr* through its left hand winding. This relay is locked through its right hand winding and its closed make contact *q*1.

By the opening of break contact *q*2 the relay A*kr* is released and due to the opening of the closed make contacts *ak*3–7 and *ak*8–12 the relays A*lr*–E*lr* and A2*r*–E2*r* are disconnected from the auxiliary register AR1. By the opening of the closed make contact *ak*2 the relays H*r* and E*ir* are disconnected from each other due to which the latter relay E*ir* in the auxiliary register AR1 is released.

The main register MR1 disconnects itself from the coupler and connecting circuits C and CC and is now able to register the third and following digits in its registering and checking circuit RCC and in corresponding storage circuits.

In the same manner as described above the various operated relays in the auxiliary register AR1 are then released and this register is disconnected from the incoming junctor IL1.

As described above the digits received in the auxiliary register AR1 are stored in the storage circuits A*r*–E*r*, R*ar*–R*er*, whereas the digits received in the main register MR1 are stored in the storage circuits A*ir*–E*ir*, A2*r*–E2*r*, etc. Each of these storage circuits has associated to it a bistate device X*r*, Y*r*, G*r*, H*r* which is brought in its 1-condition when a digit is stored in the associated storage circuit. Hereby each such bistate device in its 1-condition indicates that the next digit must be stored in the next storage circuit. The bistate devices Gr–Hr of the main register MR1 may however also be brought in their l-condition via the switching stages ARFC1, JCC1, MRFC1 before a digit has been registered in the associated storage circuit A1r–E1r, A2r–E2r, this digit being then afterwards registered via a bypath circuit C, CC, L interconnecting the main and auxiliary registers MR1 and AR1.

Figure 7:
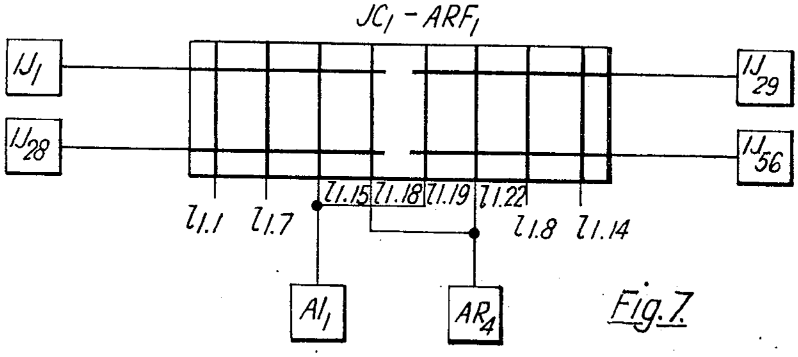
FIG. 7 shows another interconnection scheme of cross-bar switches included in a switching system according to the invention.

It should be noted that instead of interconnecting the incoming junctors, auxiliary registers and main registers in the manner shown in FIG. 2, they may also be interconnected in the way shown in FIG. 7 when only a small number of auxiliary registers has to be provided per group of incoming junctors. In this case each pair of crossbar switches such as JC1 and ARF1 is replaced by a single rapidly operating crossbar switch JC1–ARF1 consisting of two half switches each with 28 horizontal or select bars and 11 vertical or operate bars. In the same manner as shown in FIG. 2 the horizontal bars of each half switch are each connected to an incoming junctor, whereas the vertical bars l1–1 to l1–7 and l1–8 to l1–14 of each such half switch are connected to the horizontal bars of crossbar switches MRF1–14. The remaining vertical bars l1–15 to l1–18 and l1–19 to l1–22 of this crossbar switch JC1–ARF1 are now paired and connected to the auxiliary registers AR1–4. Compared with the interconnection scheme of FIG. 2, it is clear that with the interconnection scheme of FIG. 7 a gain in material is obtained and that the interconnection between an incoming junctor and a main register may be established in a much faster way since each of the slower operating crossbar switches JC1–14 has in fact been replaced by a rapidly operating crossbar switch.

While the principles of the invention have been described above in connection with specific apparatus, it is to be clearly understood that this description is made only by way of example and not as a limitation on the scope of the invention.

We claim:

1. An automatic telecommunication switching system of the indirect or register type connectable for cooperation with a telecommunication switching system of the direct or step-by-step type comprising a source of selection information signals, said switching system of the register type including a group of junctor circuits, a group of fast acting auxiliary registering means, means comprising a junctor-to-auxiliary-register connecting switch for selectively interconnecting said group of junctor circuits and said group of fast acting auxiliary registering means after one of said group of junctor circuits has been coupled to said source, said connecting switch operating within a short time interval so that said selection information signals may then be received by said fast acting auxiliary registering means, said fast acting auxiliary registering means being connected to store at least one initial entire dial pulse train representing at least one complete digit of said selecting information, said switching system of the register type further including a group of circuits comprising main registering means connected to store the remainder of said selection information signals, said main registering means being connectably coupled with said group of junctor circuits via a junctor-to-main register switching network, said network operating within a second time interval which is longer than the first short time interval, and said switching system of the register type further including a digital transfer interconnecting means for transferring said initial selection information signals from said fast acting auxiliary registering means to said main registering means, the remaining part of said selection information signals being transferred from said source to said main registering means via said group of junctor circuits and said switching network.

2. A switching system as claimed in claim 1, characterized in that said junctor-to-auxiliary-register connecting switch means includes a first switching stage and said switching network includes at least two switching stages.

3. A switching system as claimed in claim 2, characterized in that one of said two switching stages of said switching network operates as a unit with said punctor-to-auxiliary-register connecting switch means.

4. A switching system as claimed in claim 1, in which said selection information signals include a plurality of digital information portions, said auxiliary registering means including a number of groups of storage circuits equal to the maximum number of digital information portions included in said initial selection information signals, said main registering means including a number of groups of storage circuits equal to the number of digital information portions included in the entire selection information, said auxiliary registering means and said main registering means each including means for distributing said digital information portions to corresponding ones of said groups of storage circuits in said auxiliary and main registering means, respectively, said storage circuits in said auxiliary registering means being paired with a corresponding number of said storage circuits in said main registering means through said digital transfer interconnecting means for transferring said initial dial pulse trains of said selection information signals from said auxiliary registering means to said main registering means.

5. A switching system as claimed in claim 4 in which each of said groups of storage circuits in said auxiliary and main registering means has bistable means associated with it said bistable means forming part of said distributing means, said bistable means being brought into first condition when said digital information portion is stored in said associated storage circuit indicating the next information portion must be directed to the following storage circuit, said corresponding number of bistable means being brought into their first condition via said junctor-to-auxiliary-register connecting switch and said switching network when the bistable means associated with the storage circuit in said auxiliary registering means which may be paired with the storage circuit in the main registering means to which this bistable means belongs has been brought to its first condition, and each of said digital transfer means between said groups of storage circuits includes switching means controlled by the first condition of the bistable means asociated with the storage circuit in the auxiliary registering means.

6. A switching system as claimed in claim 5 in which said fast acting auxiliary registering means and said main registering means include a respective first and second input storage units provided with an output constituting said first and second common input and in which each of said information portions is temporarily stored before being distributed by said first and second distributing means respectively, and that one of said first storage units is constituted by said first input storage unit.

7. A switching system as claimed in claim 1 in which said connecting switch and said switching network comprise cross-bar switches.

References Cited

UNITED STATES PATENTS

| | | | |
|---|---|---|---|
| 2,926,218 | 2/1960 | Cain. | |
| 3,347,993 | 10/1967 | Warman et al. | |
| 2,465,539 | 3/1949 | Joel. | |
| 3,381,094 | 4/1968 | Hackett et al. | |
| 2,926,218 | 2/1960 | Cain | 179—16.4 |
| 2,465,539 | 3/1949 | Joel. | |
| 1,504,258 | 8/1924 | Matthies | 179—18.211 |

WILLIAM C. COOPER, Primary Examiner